(12) United States Patent
Melpignano et al.

(10) Patent No.: US 7,694,158 B2
(45) Date of Patent: Apr. 6, 2010

(54) PARALLEL PROCESSING METHOD AND SYSTEM, FOR INSTANCE FOR SUPPORTING EMBEDDED CLUSTER PLATFORMS, COMPUTER PROGRAM PRODUCT THEREFOR

(75) Inventors: Diego Melpignano, Monza (IT); David Siorpaes, Cortina d'Ampezzo (IT); Paolo Zambotti, Milan (IT); Antonio Borneo, Matera (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 823 days.

(21) Appl. No.: 11/408,602

(22) Filed: Apr. 18, 2006

(65) Prior Publication Data

US 2006/0259799 A1    Nov. 16, 2006

(30) Foreign Application Priority Data

Apr. 19, 2005   (EP)   .................................. 05008441

(51) Int. Cl.
*G06F 1/26* (2006.01)
*G06F 1/32* (2006.01)

(52) U.S. Cl. ........................ 713/300; 713/320; 713/323; 713/324; 713/330; 709/209; 709/251; 712/8; 712/229

(58) Field of Classification Search ................. 713/300, 713/320, 323, 324, 330; 709/209, 251; 712/8, 712/229
See application file for complete search history.

(56) References Cited

U.S. PATENT DOCUMENTS

| | | | |
|---|---|---|---|
| 5,590,284 A | | 12/1996 | Crosetto |
| 5,919,266 A | * | 7/1999 | Sud et al. ...................... 714/13 |
| 6,134,619 A | | 10/2000 | Futral et al. |
| 6,202,067 B1 | * | 3/2001 | Blood et al. ................... 707/10 |
| 6,275,845 B1 | * | 8/2001 | Tamura ....................... 718/106 |
| 6,564,302 B1 | | 5/2003 | Yagi et al. |
| 2002/0112231 A1 | | 8/2002 | Lundback et al. |
| 2002/0147932 A1 | | 10/2002 | Brock et al. ................. 713/300 |
| 2002/0156932 A1 | | 10/2002 | Schneiderman |
| 2002/0188877 A1 | | 12/2002 | Buch .......................... 713/320 |

(Continued)

FOREIGN PATENT DOCUMENTS

EP    1239368 A2    9/2002

(Continued)

OTHER PUBLICATIONS

Bradley, D., et al., "Workload-based Power Management for Parallel Computer Systems," *IBM Journal of Research and Development*, 47(5/6):703-718, Sep. 2003.

(Continued)

*Primary Examiner*—Thomas Lee
*Assistant Examiner*—Michael J Brown
(74) *Attorney, Agent, or Firm*—Lisa K. Jorgenson; Robert Iannucci; Seed IP Law Group

(57) ABSTRACT

A multi-processing system-on-chip including a cluster of processors having respective CPUs is operated by: defining a master CPU within the respective CPUs to coordinate operation of said multi-processing system, running on the CPU a cluster manager agent. The cluster manager agent is adapted to dynamically migrate software processes between the CPUs of said plurality and change power settings therein.

43 Claims, 2 Drawing Sheets

U.S. PATENT DOCUMENTS

| | | |
|---|---|---|
| 2003/0050992 A1 | 3/2003 | Davis et al. |
| 2003/0055969 A1 | 3/2003 | Begun et al. ................ 709/226 |
| 2003/0079151 A1* | 4/2003 | Bohrer et al. ............... 713/320 |
| 2003/0115495 A1 | 6/2003 | Rawson, III ................. 713/324 |
| 2003/0130833 A1 | 7/2003 | Brownell et al. |
| 2003/0217134 A1 | 11/2003 | Fontoura et al. |
| 2005/0034002 A1* | 2/2005 | Flautner .................... 713/322 |
| 2005/0289365 A1* | 12/2005 | Bhandarkar ................. 713/300 |

OTHER PUBLICATIONS

Elnozahy, E., et al., "Energy Efficient Server Clusters," in *Proceedings of the Workshop on Power-aware Computing Systems*, Feb. 2, 2002.

Pinheiro, E., et al., "Load Balancing and Unbalancing for Power and Performance in Cluster-Based Systems," Technical Report DCS-TR-440, Rutgers University, Dept. of Comp. Sci., May 2001.

\* cited by examiner

PARALLEL PROCESSING METHOD AND SYSTEM, FOR INSTANCE FOR SUPPORTING EMBEDDED CLUSTER PLATFORMS, COMPUTER PROGRAM PRODUCT THEREFOR

BACKGROUND OF THE INVENTION

1. Field of the Invention

The invention relates to parallel processing and was developed with specific attention paid to the possible application to embedded systems and multi-core System-on-Chips.

Throughout this description reference will be made to acronyms that are of common usage in the art of embedded systems and related areas. A glossary of the most common acronyms used in this description is reported below.

| Glossary | |
|---|---|
| API | Application Programmers' Interface |
| CM | Cluster Manager |
| HA | High Availability |
| HP | High Performance |
| MAC | Medium Access Control |
| MPI | Message Passing Interface |
| OS | Operating System |
| PM | Power Management |
| PVM | Parallel Virtual Machine |
| SMP | Symmetric Multi Processing |
| SMT | Symmetric Multi Threading |
| SoC | System on Chip |
| SSI | Single System Image |
| VLIW | Very Long Instruction Word |

2. Description of the Related Art

Clusters of workstations are being used nowadays as a cost effective replacement for mainframes in scientific applications (high-performance clusters, HP). Each node in a cluster may be a single processor or a symmetric multiprocessor (SMP). Usually the connection among cluster nodes is a dedicated high-speed link but clusters may also be formed by connecting hosts on the Internet. Another domain where clusters are used is high-availability (HA) servers, where Single System Image (SSI) middleware provides the cluster application programmer the illusion of working on a single workstation.

A key factor for cluster efficiency is inter-processor communication, which, in turn, has a strong dependency on application partitioning. In order to take advantage of the computational power that is available by clustering several workstations together, applications usually need to be re-written. In HP clusters, tasks on different processors communicate with such libraries as MPI, PVM, and P4, so applications need to use the API's defined by those libraries. In HA clusters, the main problem to solve is load-balancing, so a middleware layer (that can also be implemented in the OS) takes care of moving processes among cluster nodes in order to guarantee that nodes are equally loaded (from a CPU and memory point of view). Notable examples are the openMosix and Beowulf projects.

With slight differences, in both solutions an application only needs to fork and the middleware layer can move the child process to a different node depending on its priority in the cluster and its current load. Processes use shared memory to communicate with each other, while the middleware layer re-routes system calls to processes that have been migrated.

More generally, present-day embedded systems are required to support applications with growing complexity, and computational power demand increases proportionally. To satisfy this requirement, multi-processor solutions are currently being investigated. However, in order to fully exploit the available computational power, applications should properly support parallelism.

The field of parallel processing or multiprocessing in general has been extensively investigated in the last twenty years. Solutions have ranged from transputers to clusters of workstations, with specific focus on a number of key issues, namely: 1) efficient communication bus to interconnect processing nodes, 2) cache coherency in non-uniform memory architectures and 3) message passing libraries to enable communication among process tasks in different nodes. Links to background material can be found, for example, at the Internet address http://www.classiccmp.org/transputer.

In U.S. Pat. No. 6,564,302, hardware arrangements are described that enable a cluster of processing nodes to synchronize hierarchical data caches in order to efficiently exchange data and access external shared memory. The method described requires dedicated hardware support to implement cache coherency.

In U.S. Pat. No. 6,134,619, a hardware-aided method to accomplish effective pass-on of messages between two or more processors is described, while US-A-2003/0217134 discloses a method for flexible management of heterogeneous clusters, such as those that can typically be found in web search engines systems, where three different clusters are in charge of web-spidering, data storage and data mining. Such an arrangement accomplishes efficient communication between clusters by using data gathering services to send data operating information.

In US-A-2003/0130833, a solution is proposed for the quick deployment and reconfiguration of computing systems having virtualized communication networks and storage. This document does not address the problem of running distributed applications among multiple processors but proposes a solution that has a marked impact on computer interconnections structure and storage area design. It targets multi-processing enterprise systems stressing on network load balancing and failover features without taking into account any power consumption issues.

In US-A-2003/0050992 the problem of discovering service processors among a multi-node computing system (such as a server system) is addressed. The relative arrangement claims to free OS and management consoles from having to know where different hardware services are located within a network of heterogeneous and function-dedicated nodes.

US-A-2002/0112231 discloses a method of automatically loading different software modules in different hardware platforms by means of some kind of a database that maps univocally a hardware card to a software module. The corresponding solution is essentially static and is meant to free operators from the burden of manually uploading software modules into relevant hardware modules. Also, no power efficiency problems are addressed.

EP-A-1 239 368 proposes a method of distributing complex tasks among multiple low-powered devices via a wireless interface. This prior art document does not take into account the possibility of executing different jobs on dedicated nodes either, and, again, power consumption issues are neglected.

Still another document related to the same subject-matter topics is US-A-2002/156932 which again does not optimize overall system power consumption and does not take into account processors performance tuning according to applications requirements.

Additionally, U.S. Pat. No. 5,590,284 discloses a dynamically configurable communication bus among transputer nodes separated into a serial path for real-time control commands and a fast parallel bus for large data transfers. Dedicated hardware is needed in each communication node to manage high-speed data transfer. The concept of master and slave nodes is also introduced, the master role being time shared among nodes. The communication bus is designed to support dynamic topology reconfiguration, task redistribution among nodes and maximum data transfer rates. This prior art document addresses the problem of dynamic reconfiguration of communication resources, which is overly complicated for usual embedded systems, where the master node is fixed.

Both US-A-2002/188877 and US-A-2002/147932 address the problem of power consumption in multiprocessing systems. Specifically, US-A-2002/188877 refers to an SMP system with a Java virtual machine where a dedicated application moves threads of execution to different CPUs and at the same time controls their low-power modes. The system tries to determine the minimum number of CPUs required to perform a specific task, distributes threads accordingly and puts the unnecessary CPUs into a low-power mode. This approach requires SMP hardware and has a rather coarse-grained power control. The arrangement described in US-A-2002/147932 is a multiprocessing system with fine-grained power control on individual CPUs, based on feedback received by temperature and noise sensors.

BRIEF SUMMARY OF THE INVENTION

One embodiment of the present invention is an improved arrangement that:
- is adapted for mobile multiprocessing in order to adapt existing scalable clustering solutions to the embedded domain while optimizing power efficiency;
- while not addressing per se cache coherency issues (for which a large amount of literature and solutions are available), may focus on application distribution techniques in embedded clusters environments;
- may make use of pure software-based message passing mechanisms within the framework of an arrangement targeted to embedded clusters with power efficiency optimization in mind.

One embodiment of the present invention provides a method having the features set forth in the claims that follow. The invention also relates to a corresponding system, as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

A particularly preferred embodiment of the invention is thus a multi-processing system including a cluster of processors having respective CPUs, possibly with different architectures, wherein:
- a master CPU is defined within said respective CPUs to coordinate operation of said multi-processing system,
- a cluster manager agent is run on said master CPU for dynamically allocating software processes over said CPUs and changing power settings therein.

The CPU cluster is preferably implemented in a SoC.

In such a preferred embodiment, given whatever user process, a decision is taken as to what processor or what kernel is best suited to run it. The decision may be taken with respect to the current CPU load or depending on the nature of the process itself. If needed, CPU speed can also be tuned according to the resource requirements in order to reduce power consumption. In the arrangement disclosed herein, feedback on cluster utilization is not based on physical sensors but on the software-monitored CPU loads. Furthermore, applications are known a priori and their characteristics can be taken into account to partition processes among CPUs (for example by looking at profiling information). Finally, in the arrangement disclosed herein, hardware constraints are properly taken into account when determining where processes need to be activated in the cluster to support heterogeneous processor architectures. For example, if an application is known to benefit from a hardware co-processor that is physically connected to a specific CPU in the cluster, the CM will activate such application in that CPU.

BRIEF DESCRIPTION OF THE SEVERAL VIEWS OF THE DRAWINGS

The invention will now be described, by way of example only, with reference to the enclosed figures of drawing, wherein.

DETAILED DESCRIPTION OF THE INVENTION

Figure 1:
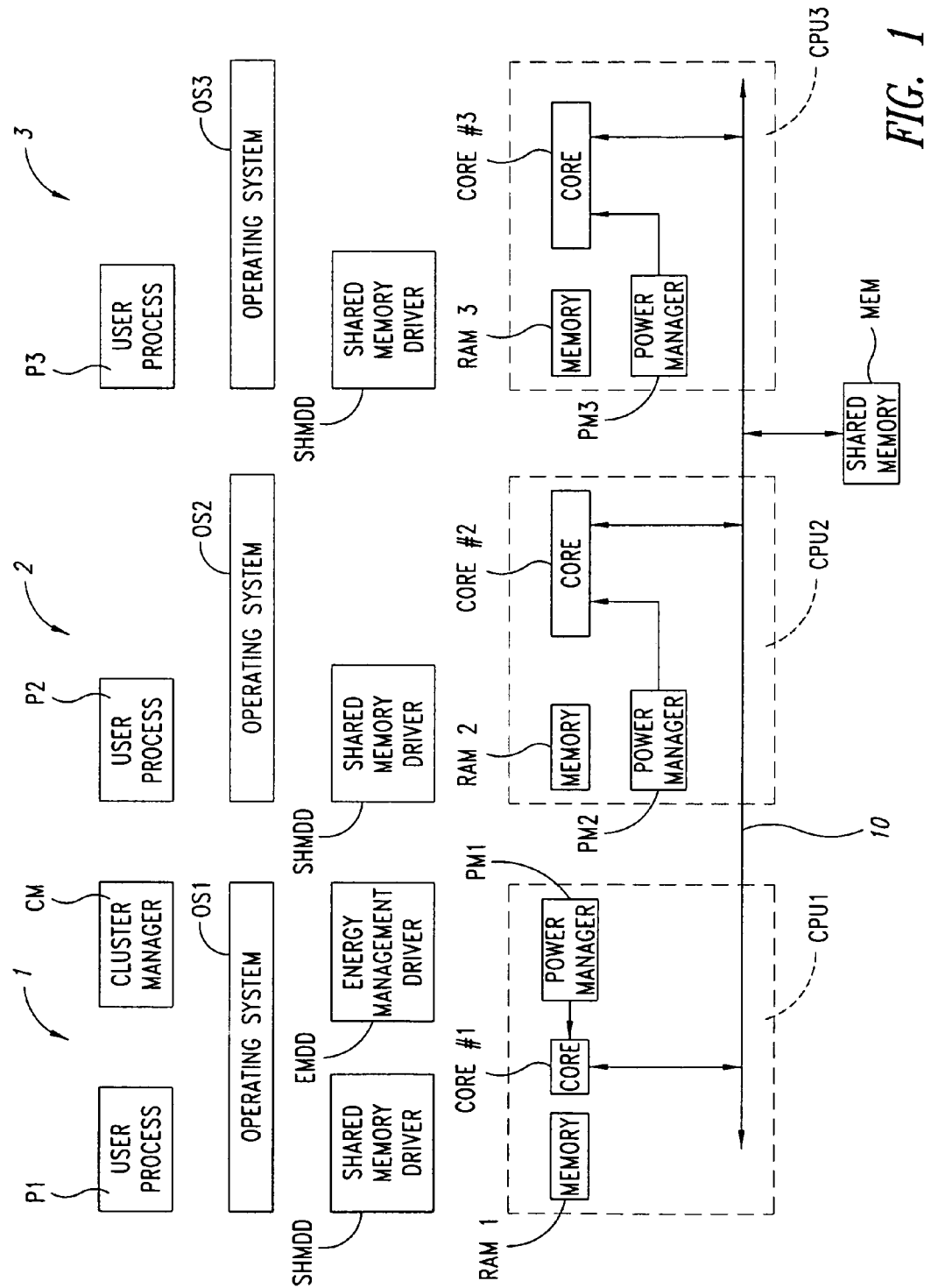
FIG. 1 is a block diagram representative of an embedded multiprocessing cluster.

The block diagram of FIG. 1 shows an exemplary embodiment of the arrangement described herein, where three processors are used designated 1, 2, and 3, respectively.

The upper part of the diagram shows the related components including the operating systems OS, the device drivers (notionally partitioned between shared memory device drivers (SHMDD) and energy management device drivers (EMDD) and the user space applications: a cluster manager (CM) and user processes P1, P2, and P3.

The three central processing units CPU1, CPU2 and CPU3 (having respective cores designated Core #1, Core #2, and Core #3) are connected through a bus 10 and share a common main memory area MEM in the form of a RAM. Local memory areas designated RAM1, RAM2, and RAM3 are available to reduce bus accesses.

Within the cluster a so-called "master" CPU is defined (in the case shown in FIG. 1, the master CPU is CPU1), which coordinates the operation of the whole multiprocessing system by means of the cluster manager software agent (CM). The CM can dynamically migrate software (SW) processes and change power settings (frequency, voltage) for each processing node, depending on application needs. In order to do so, specific mechanisms should be implemented in the operating system and in hardware.

Finally, references PM1, PM2 and PM3 designate hardware blocks that are responsible for power management in each of the processors and are centrally controlled by the cluster manager in the master processor.

The operating systems OS periodically exchange messages through shared memory and mailboxes. In this way, the CPU load of each of them is known at the master and activating processes on the least loaded core is therefore possible for load-balancing reasons.

Inter-processor communication is implemented by means of a suitable shared memory device driver (SHMDD) arrangement, designed to optimize message/data exchange efficiency. Processor priorities are dynamically set by the cluster manager CM, which can thereby control what CPU processes are to be activated or migrated by the operating systems.

Process migration involves the replication of the process context (registers, memory) and may involve device drivers in case the process makes use of some peripherals.

Process activation launches a new process on a specific processor and suitable communication mechanisms are put in place between the master and the slave processor. It is worth noting that process activation, which is actually simpler to implement than process migration, may well be sufficient for the class of embedded systems targeted by this invention.

The main functions of the cluster manager CM are:
controlling processor priorities to influence automatic process activation or migration, based on periodic reports from each of the processors with indication of CPU load and memory used;
forcing migration or activation of a process to a specific cluster node (because of HW constraints reasons: for example, when a specific CPU has a tightly-coupled HW coprocessor connected, a SW process that benefits from such accelerator should be activated there;
controlling clock frequency and voltage for each of the processors in the cluster (thereby putting them into sleep mode to save energy, when not in use), also based on knowledge of application characteristics;
possibly turning off one or more CPUs by saving their state (registers, stack . . . ) in RAM or Flash and, vice versa, turning on one or more CPUs and restoring its state;
loading and unloading kernel modules in the operating systems of the processors 1, 2, 3.

As indicated, the hardware blocks PM1, PM2, PM3 are responsible for power management in each of the processors and they are centrally controlled by the CM in the master processor. Each block controls power consumption within the respective processor 1, 2, and 3 by combining mechanisms like frequency and voltage scaling. The power management block can also completely power down a CPU when instructed to do so by the CM.

Priorities and clock frequencies are dynamically assigned to the processors 1, 2, and 3 by taking into account overall cluster CPU load, target energy consumption budget and application QoS (Quality of Service) requirements. The target is performance maximization at the minimum energy cost, given a specific set of applications running on the platform.

The exact definition of the criteria for assigning power settings to CPUs depending on the overall load is not—per se—an object considered by the instant disclosure, which primarily focuses on dynamic power management coupled with process activation/migration under the control of a cluster manager. Nonetheless, an example will be described below.

In a typical case, the embedded system as schematically shown in FIG. 1 will initially be in a power saving mode where clocks have been scaled down for all processors. It is also possible that some CPU cores will not be powered at all to save energy.

When the user wants to start an application, the master processor will process the request. The master processor in question will launch the user's process on the local CPU if the static profiling information indicates a moderate load.

When the application is started and the dynamically monitored CPU load exceeds a specified threshold, a second node will be taken out of sleep by the cluster manager CM. The operations performed at this step include:
scaling up the clock for the second node and waiting until it has stabilized; and
increasing the node priority in the cluster so that processes can be activated in the new node by means of the operating systems.

At this point, the cluster manager CM monitors the overall CPU load in the cluster and decides if more processing power is needed. If not, then it scales down clocks for all active nodes until individual CPU load approaches 100%. This strategy guarantees the minimum power consumption for the cluster. Reducing CPU clock frequencies has also a beneficial effect on cache misses, which is a key factor in saving energy. When performing this operation, specific application constraints should be considered, for example in case applications work on real-time data processing, therefore having delay bounds. Being in an embedded environment, applications running in the cluster are known and have been benchmarked. This static information can be taken into account by the cluster manager when deciding on which node the new process should be activated.

Figure 2:
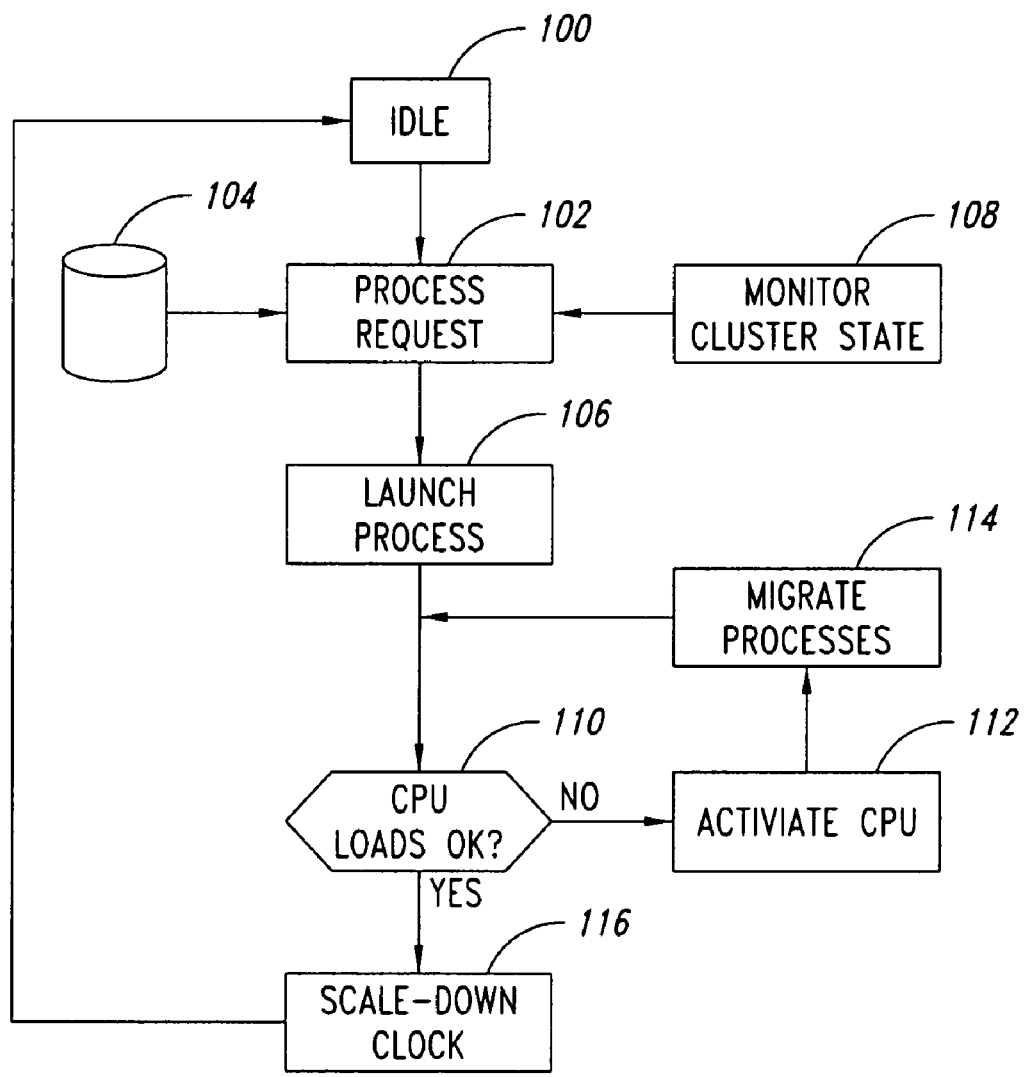
FIG. 2 is a flow chart representative of cluster management logic within the framework of the arrangement described herein.

The foregoing will now be further illustrated by referring to the flow-chart of FIG. 2.

The cluster manager CM is normally in an idle state (step 100), waiting for external events to occur (user input, changed CPU conditions, OS signals). When a new process has to be started, the request received (step 102) is processed by taking into account the current cluster state (CPU loads, memory occupation . . . ) and the application profiles (block 104), which are usually known in an embedded platform.

After the process has been launched (step 106), the cluster manager CM monitors the new cluster state (essentially by monitoring CPU loads—step 108) and new CPUs are taken out of sleep until there is enough computational power available to run the application.

Specifically, this process involves checking the current CPU loads (step 110) in order to ascertain whether they are acceptable/tolerable or not.

In the negative, other CPUs are activated (step 112) and as new CPUs are logically added to the cluster, some processes can be migrated there (step 114).

In the positive, a CPU clock scale-down process is activated (step 116) after which the system loops back to the idle state of step 100.

More to the point, once the system has stabilized, the Cluster Manager CM goes into a state where it tries to reduce the frequencies of all the active CPUs until all of them approach 100%, as already explained.

Instead of individually scaling down clocks for the active CPUs, it is also possible to use other power reduction techniques including (but not limited to):
running the CPUs at full clock frequency but in a round-robin fashion, where each CPU toggles between a sleep mode (with the clock frozen) and a full-speed active mode in coordination with its neighbors; and
individually scaling CPU voltage proportionally with the clock frequency.

Processing nodes in the cluster that are not necessary to the instantaneous computational needs may be put in "doze" mode. Recent technological developments allow the clock to be "frozen" and the voltage to be drastically reduced, with the guarantee that flip-flops can retain their state.

The granularity for taking advantage of such parallel architecture is the process and specific CPU intensive applications (like multimedia applications) should be preferably partitioned by the programmer into separate processes that communicate through standard mechanisms (shared memory, pipes and so on).

As an example, an application may call the POSIX fork( ) function, which creates a child process where a specific function is executed. In case of a video encoder, the child process may be a motion estimator, which would be then moved to a dedicated processor by the cluster manager CM. Alternatively, the main application may call the POSIX execv() function, which creates a new independent process. The cluster manager CM may intercept this call and launch the new process on the target CPU.

Partitioning the application into smaller tasks makes load-balancing increasingly effective. Of course, the drawback of an excessive partitioning is communication overhead in the communication bus 10 that links the CPUs together and consequently increased power consumption. Transactional level system simulation tools can be used offline to find optimal tradeoffs between power consumption and performance for any given application under specific assumptions of the platform state. The output of such simulators complements dynamic profiling information and is used by the cluster manager CM in the process activation phase.

Embedded clusters may be built using homogeneous processors or not. A common configuration could be one host processor (the master) and multiple DSPs. In that case, the host processor may need to manage binaries in multiple formats and dispatch them to processors by taking into account their architecture. Also in the case of a homogeneous cluster, the kernels on each of the processors may be configured differently. For example, one processor may require a kernel configured for real-time operation because it performs MAC processing. In another case, the kernel in the master node may include full networking functionality while the others may be configured to be as tiny as possible.

The configuration of each of the kernels may also change dynamically under control of the cluster manager. In the above MAC example, the real-time scheduler is a kernel module (a common feature in such OS as Linux), so the cluster manager CM could load it, when it is required. The CM should therefore be able to activate a kernel module in a specific CPU when needed.

One common observation related to an embedded cluster like the one disclosed here is that there is one instance of the same operating system running on each of the CPUs. This could be wasteful in terms of memory unless suitable arrangements are taken. To solve this problem in case the same kernel image is executed by a number of homogeneous CPUs, the boot procedure of each of the involved processors should make sure that the OS is decompressed into a specific region of a shared RAM and that each subsequent processor that is booted can run the OS by "pointing" to the same read-only region in memory. This approach does not only reduce the amount of memory in the system, but also increases power efficiency. Suitable arrangements are provided in the OS booting phase for the above configuration to work, but the related description is outside the scope of this disclosure.

The arrangement described herein can be embodied in standard products such as, e.g., the STm8010 SoC (commercially available from STMicroelectronics) that embeds three ST230 VLIW cores and is adapted for use in DVD and STB applications. Other possible embodiments include multi-core Systems-on-Chip in general where CPU cores may be heterogeneous, e.g., any combination of a host CPU, DSP and SMP nodes integrated into a single chipset. The arrangement described herein provides a new, improved way of building a scalable embedded system, optimized for power efficiency. It requires no complex HW modifications to CPU cores as is the case of conventional SMP systems and is well suited to make use of existing open source clustering software. A major advantage lies in that the arrangement described herein offers a simple programming model that enables to easily exploit platform parallelism. At the same time, the cluster is always configured to consume the minimum amount of energy.

Without prejudice to the underlying principles of the invention, the details and the embodiments may vary, also appreciably, with reference to what has been described by way of example only, without departing from the scope of the invention as defined by the annexed claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A method, comprising:
  operating a parallel processing system including a cluster of processors having respective CPUs connected to each other through a bus; and
  assigning priorities and clock frequencies to the processors in said cluster, taking into account parameters selected out of a group consisting of overall cluster CPU load, energy consumption, and application QoS requirements;
  the operating including:
  defining a master CPU within said respective CPUs to coordinate operation of said parallel processing system; and
  running on said master CPU a cluster manager agent, said cluster manager agent being structured for dynamically allocating software processes over said CPUs and changing power settings therein, the changing power settings including running active CPUs in said cluster at full clock frequency in a round-robin fashion in which each active CPU toggles between sleep mode and full-speed active mode.

2. The method of claim 1, wherein said changing power settings includes at least one of changing frequency and voltage of operation of said CPUs.

3. The method of claim 1, further comprising:
  providing hardware blocks for power management in each of said processors; and
  centrally controlling said hardware blocks by means of said cluster manager agent.

4. The method of claim 1, further comprising:
  providing in said processors respective operating systems; and
  exchanging messages between said operating systems thereby making a CPU load of each said processors known to said master CPU.

5. The method of claim 1, further comprising dynamically setting processor priorities by means of said cluster manager agent, whereby said cluster manager agent controls what CPUs are to be activated.

6. The method of claim 1, further comprising implementing inter-processor communication between the processors in said cluster via a shared memory device driver arrangement.

7. The method of claim 1 wherein dynamically allocating software processes involves at least one of:

migrating with a replication of a process context; and activating of a new process on one of said CPUs, the one CPU having a load that is less than other of said CPUs.

8. The method of claim 1, further comprising effecting via said cluster manager agent at least one of the following functions:

controlling processor priorities between said processors in said cluster to influence automatic process activation or process migration;

detecting at least one of CPU load and memory used in each processor in said cluster;

forcing activation or migration of a process to a specific processor in said cluster;

controlling at least one of clock frequency and voltage for each said processors in said cluster;

turning off one or more CPUs in the processors in said cluster; and loading and unloading kernel modules in operating systems of the processors in said cluster.

9. The method of claim 1, further comprising:

starting one application on a CPU in one of the processors in said cluster;

monitoring CPU load when running said application started; and when the CPU load exceeds a given threshold, activating a further CPU in said processors in said cluster.

10. The method of claim 9, further comprising:

scaling up a clock for said further CPU in said processors in said cluster, waiting until it has stabilized; and increasing node priority in said cluster so that new processes can be activated in said further CPU.

11. The method of claim 1, further comprising:

said cluster manager agent monitoring an overall CPU load in said processors in said cluster;

checking whether more processing power is needed in view of an application to be run over said processors in said cluster; and if no additional processing power is needed, reducing power consumption in the active processors in said cluster.

12. The method of claim 1 wherein changing power settings involves scaling down clocks for active processors in said cluster.

13. The method of claim 1 wherein changing power settings includes:

individually scaling CPU voltage as a function of clock frequency.

14. The method of claim 1, further comprising, in case a same kernel image is executed by a plurality of said CPUs, the steps of:

providing a shared memory area for said CPUs;

decompressing operating systems of said processors in said cluster into a specific region of said shared memory area; and causing each subsequent processor that is booted to run said operating system by pointing to said region in said shared memory area.

15. The method of claim 1, further comprising configuring said cluster of processors as an embedded cluster of processors.

16. The method of claim 1, further comprising configuring said cluster of processors as having respective CPUs with different architectures.

17. The method of claim 1, further comprising changing power settings depending on dynamically collected measurements of a status of said cluster of processors as well as static profiling information related to applications that run on such processors.

18. A parallel processing system, comprising a cluster of processors having respective CPUs connected to each other through a bus, the CPUs including a master CPU to coordinate operation of said parallel processing system; and a cluster manager agent configured for running on said master CPU to:

assign priorities and clock frequencies to the processors in said cluster, taking into account parameters selected out of a group consisting of overall cluster CPU load, energy consumption, and application QoS requirements;

dynamically allocate software processes over said CPUs; and change power settings therein by running active CPUs in said cluster at full clock frequency in a round-robin fashion in which each active CPU toggles between sleep mode and full-speed active mode.

19. The system of claim 18, wherein said cluster manager agent is configured for changing said power settings by changing at least one of frequency and voltage of operation of said CPUs.

20. The system of claim 18 wherein each of said processors includes hardware blocks for power management, said hardware blocks being centrally controlled by means of said cluster manager agent.

21. The system of claim 18 wherein said processors include respective operating systems that exchange messages between them, thereby making a CPU load of each said processors known to said master CPU.

22. The system of claim 18 wherein said cluster manager agent is configured for dynamically setting processor priorities, whereby said cluster manager agent controls what CPU processors are to be activated.

23. The system of claim 18, further comprising a shared memory device driver arrangement implementing inter-processor communication between the processors in said cluster.

24. The system of claim 18 wherein said cluster manager agent is configured for dynamically allocating software processes via at least one of:

migration with a replication of a process context; and activation of a new process on one of said CPUs, the one CPU having a load that is less than other of said CPUs.

25. The system of claim 18 wherein said cluster manager agent is configured for performing at least one of the following functions:

controlling processor priorities between said processors in said cluster to influence automatic process activation or migration;

detecting at least one of CPU load and memory used in each processor in said cluster;

forcing activation or migration of a process to a specific processor in said cluster;

controlling at least one of clock frequency and voltage for each said processors in said cluster;

turning off one or more CPUs in the processors in said cluster; and loading and unloading kernel modules in operating systems of the processors in said cluster.

26. The system of claim 18 wherein said cluster manager agent is configured for:

starting one application on a CPU in one of the processors in said cluster;

monitoring CPU load when running said application started; and when CPU load exceeds a given threshold, activating a further CPU in said processors in said cluster.

27. The system of claim 26, wherein said cluster manager agent is configured for:
scaling up a clock for said further CPU in said processors in said cluster, waiting until the clock has stabilized; and
increasing node priority in said cluster so that new processes can be activated in said further CPU.

28. The system of claim 18 wherein said cluster manager agent is configured for:
monitoring an overall CPU load in said processors in said cluster;
checking whether more processing power is needed in view of an application to be run over said processors in said cluster; and
if no additional processing power is needed, reducing power consumption in active processors in said cluster.

29. The system of claim 18 wherein said cluster manager agent is structured to change power settings by scaling down clocks for active processors in said cluster.

30. The system of claim 18 wherein said cluster manager agent is structured to change power settings by:
individually scaling CPU voltage as a function of the clock frequency.

31. The system of claim 18, further comprising:
a shared memory area for a plurality of said CPUs that are executing a same kernel image, the shared memory area including a specific region storing a decompressed operating system, wherein the cluster manager agent is structured to cause each subsequent processor that is booted to run said operating system by pointing to said region in said shared memory area.

32. The system of claim 18, wherein said cluster of processors is an embedded cluster of processors.

33. The system of claim 18 wherein the respective CPUs of said cluster of processors have different architectures.

34. The system of claim 18 wherein said cluster manager agent is configured for changing said power settings depending on dynamically collected measurements of a status of said cluster of processors as well as static profiling information related to applications that run on such processors.

35. A computer-readable medium having contents that cause a computing device to perform a method comprising:
operating a parallel processing system including a cluster of processors having respective CPUs connected to each other through a bus; and
assigning priorities and clock frequencies to the processors in said cluster, taking into account parameters selected out of a group consisting of overall cluster CPU load, energy consumption, and application QoS requirements; the operating including;
defining a master CPU within said respective CPUs to coordinate operation of said parallel processing system; and
running on said master CPU a cluster manager agent, said cluster manager agent being structured for dynamically allocating software processes over said CPUs and changing power settings therein, the changing power settings including running active CPUs in said cluster at full clock frequency in a round-robin fashion in which each active CPU toggles between sleep mode and full-speed active mode.

36. The computer-readable medium of claim 35, wherein said processors have respective operating systems, and the method further includes:
exchanging messages between said operating systems thereby making a CPU load of each said processors known to said master CPU.

37. The computer-readable medium of claim 35 wherein dynamically allocating software processes involves at least one of:
migration with a replication of a process context; and
activation of a new process on one of said CPUs, the one CPU having a load that is less than other of said CPUs.

38. The computer-readable medium of claim 35, wherein the method further includes:
starting one application on a CPU in one of the processors in said cluster;
monitoring CPU load when running said application started; and
when the CPU load exceeds a given threshold, activating a further CPU in said processors in said cluster.

39. The computer-readable medium of claim 35, wherein the method further includes:
scaling up a clock for said further CPU in said processors in said cluster, waiting until it has stabilized; and
increasing node priority in said cluster so that new processes can be activated in said further CPU.

40. A method, comprising:
operating a parallel processing system including a cluster of processors having respective CPUs connected to each other through a bus; and
assigning priorities and clock frequencies to the processors in said cluster, taking into account parameters selected out of a group consisting of overall cluster CPU load, energy consumption, and application QoS requirements:
the operating including:
defining a master CPU within said respective CPUs to coordinate operation of said parallel processing system; and
running on said master CPU a cluster manager agent, said cluster manager agent being structured for dynamically allocating software processes over said CPUs and changing power settings therein, the changing power settings depending on static profiling information related to applications that run on such processors.

41. The method of claim 40, wherein said changing power settings includes at least one of changing frequency and voltage of operation of said CPUs.

42. The method of claim 40 wherein said changing power settings involves scaling down clocks for active processors in said cluster.

43. The method of claim 40, further comprising configuring said cluster of processors as an embedded cluster of processors.

* * * * *

UNITED STATES PATENT AND TRADEMARK OFFICE
CERTIFICATE OF CORRECTION

PATENT NO. : 7,694,158 B2
APPLICATION NO. : 11/408602
DATED : April 6, 2010
INVENTOR(S) : Diego Melpignano et al.

Page 1 of 1

It is certified that error appears in the above-identified patent and that said Letters Patent is hereby corrected as shown below:

Title Page, Item (75)
"Paolo Zambotti, Milan (IT)" should read as --Paolo Zambotti, Milano (IT)--

Signed and Sealed this
Twenty-fifth Day of January, 2011

David J. Kappos
*Director of the United States Patent and Trademark Office*